United States Patent [19]

Nakamura

[11] Patent Number: 5,708,775
[45] Date of Patent: Jan. 13, 1998

[54] FAULT INFORMATION NOTIFICATION SYSTEM LOCALIZED AT EACH NETWORK SERVER

[75] Inventor: Jun Nakamura, Kanagawa, Japan

[73] Assignee: Fuji Xerox Co., Ltd., Tokyo, Japan

[21] Appl. No.: 543,917

[22] Filed: Oct. 17, 1995

[30] Foreign Application Priority Data

Apr. 19, 1995 [JP] Japan ................................. 7-116587

[51] Int. Cl.$^6$ ..................................................... G06F 11/00
[52] U.S. Cl. ............................ 395/185.01; 395/184.01; 395/185.1
[58] Field of Search ..................... 395/185.01, 185.1, 395/184.01, 183.21, 600, 182.02, 183.22

[56] References Cited

U.S. PATENT DOCUMENTS

| 4,893,232 | 1/1990 | Shimaoka et al. | 395/600 |
|---|---|---|---|
| 5,084,875 | 1/1992 | Weinberger et al. | 395/183.22 |
| 5,237,677 | 8/1993 | Hirosawa et al. | 395/185.1 |
| 5,299,207 | 3/1994 | Fujii | 395/183.21 |
| 5,307,353 | 4/1994 | Yamashita et al. | 395/182.02 |
| 5,448,724 | 9/1995 | Hayashi | 395/182.02 |

FOREIGN PATENT DOCUMENTS

| 0 471 637 A2 | 2/1992 | European Pat. Off. |
|---|---|---|
| 6-62006 | 3/1994 | Japan . |
| 6-266635 | 9/1994 | Japan . |
| 6-348630 | 12/1994 | Japan . |

OTHER PUBLICATIONS

Patent Abstracts of Japan, Kokai No. 5–108397, vol. 17, No. 467, Aug. 25, 1993.

*Primary Examiner*—Ly V. Hua
*Attorney, Agent, or Firm*—Finnegan, Henderson, Farabow, Garrett & Dunner, L.L.P.

[57] ABSTRACT

In a fault information notification system for notifying a manager unit of faults detected by a server unit on a network system in which a plurality of server units and the manager unit which manages the server units are connected in a network, each server unit comprises a fault information producing unit for producing fault information for various faults detected by the server unit to which sequence numbers are assigned, a fault recording unit for recording respective information in an extractable data structure for each fault information, and a fault history search unit for searching corresponding fault history information from the fault recording unit in response to a fault history search request including the reference numbers from the manager unit.

7 Claims, 9 Drawing Sheets

| NUMBER | PROTOCOL | DESTINATION ADDRESS | PORT | IN-USE FLAG |
|---|---|---|---|---|
| 1 | TCP | 129.249.38.11 | 2245 | IN-USE |
| 2 | TCP | 129.249.38.19 | 3391 | IN-USE |
| 3 | TCP | 129.249.38.111 | 4088 | NOT-IN-USE |
|   |   |   |   |   |
| ⋮ | ⋮ | ⋮ | ⋮ | ⋮ |
| N | TCP | 129.249.22.11 | 2245 | IN-USE |

FAULT INFORMATION NOTIFICATION SYSTEM LOCALIZED AT EACH NETWORK SERVER

BACKGROUND OF THE INVENTION

The present invention relates to a fault information notification system, and in particular to a fault information notification system which can notify a manager unit of faults occurring in server units of a network system.

Conventionally, as techniques relating to network management, techniques such as, for example, a "Network System" described in Japanese Patent Unexamined Publication No. Hei. 6-62006, a "Network Resource Supervision System" described in Japanese Patent Unexamined Publication No. Hei. 6-266635, and a "Phenomenon Report Management System" described in Japanese Patent Unexamined Publication No. Hei. 6-348630 are known.

However, in the fault supervision techniques for network management of the "Network System" described in Japanese Patent Unexamined Publication No. Hei. 6-62006, the "Network Resource Supervision System" described in Japanese Patent Unexamined Publication No. Hei. 6-266635, and the like, because the fault information reported to the manager unit (supervisory unit) is not recorded in the server unit itself, in a manager unit started after the occurrence of a fault in the server unit, for example, there is the problem that information which is different from that indicated in another manager unit is indicated and is in a condition where the cause and development of the fault occurrence cannot be known.

Also, in the technique of the "Phenomenon Report Management System" described in Japanese Patent Unexamined Publication No. Hei. 6-348630, information on the phenomenon which has occurred and is to be managed is recorded in a log of a selected server unit (agent system), and although report information on the phenomenon is transmitted to the manager unit (manager system), it is unclear from the report information on the phenomenon received by the manager unit in what position in the log e.g. fault information contained in the information of the phenomenon report is recorded. For this reason, there is the problem that, even if an attempt is conducted to search the history of the fault information to find the cause of the fault occurrence, it is unclear where to read the log file from and the history of the fault information cannot be effectively searched.

SUMMARY OF THE INVENTION

The present invention was made in order to solve the above-described problems and has an object to provide, in a network system, a fault information notification system in which the manager unit can freely search fault histories, and which records, manages and can notify information on faults occurring in server units of the network system to the manager unit so that it is not necessary for the manager unit to maintain fault information.

In order to solve the above objects, according to a first aspect of the invention, in a fault information notification system for notifying a manager unit of faults detected by a server unit on a network system in which a plurality of server units and the manager unit for managing the server units are connected to the network, the network fault information notification system is characterized in that each server unit comprises a fault information producing means for producing fault information to which sequence numbers are assigned, with respect to various faults detected by the server unit, a fault recording means for recording respective information in an extractable data structure for each fault information, and a fault history search means for searching corresponding fault history information from the fault recording means in response to a fault history search request including the reference numbers from the manager unit.

Also, in a fault information notification system according to a second aspect of the present invention, the fault history search request includes a plurality of sequence numbers, and the fault history search means searches a plurality of fault history information in response to the fault history search request.

Further, in a fault information notification system according to a third aspect of the present invention, the server unit further comprises a destination registration means for registering the manager unit as a destination of fault notification in response to a fault notification request from the manager unit, and a notification means for, after a fault is searched, notifying a manager unit which has been registered in the destination registration means of produced fault information to which a sequence number has been assigned.

Further still, in a fault information notification system according to a fourth aspect of the present invention, the destination registration means deletes registration of the registered manager unit according to a notification cancellation request from the manager unit.

In addition, in a fault information notification system according to a fifth aspect of the present invention, the fault recording means includes a sequence number indicating latest fault information, and the latest fault information is responded according to a fault history search request from the manager unit which does not include a sequence number.

In the fault information notification system of the present invention provided with such features, in a network system which connects a plurality of server units and a manager unit for managing the server units in a network, information on faults detected by a server unit is reported to the manager unit. Here, fault information producing means, fault recording means and fault history search means are provided in these server units. The fault information producing means produces fault information with sequence numbers attached thereto with respect to various faults detected by the server unit, and the produced fault information is recorded in an extractable data format for each fault information by the fault recording means. Then, the fault history search means searches corresponding fault history information from the fault recording means and responds according to a fault history search request including the sequence number from the manager unit.

In this way, information on various faults detected by each server unit is each given with sequence numbers, recorded and managed. By such means, according to a fault history search request including a sequence number from the manager unit, information on the history of the fault can be easily obtained. Also, in the fault information notification system of the present invention, where the fault history search request includes a plurality of sequence numbers, the fault history search means searches a plurality of fault history information according to the fault history search request and responds. For this reason, fault histories for various server units can be easily obtained from the manager unit.

Also, in the fault information notification system of the present invention, the server units are further provided with an destination registration means and notification means. By means of the destination registration means, according to a fault notification request from the manager unit, the manager unit is registered as the destination of fault notification, whereupon the notification means, after detecting the fault, reports the fault information produced with sequence number attached to the manager unit registered in the destination registration means. By these means, since where a fault is detected it is reported to the manager unit which is already registered, the necessity for the manager unit to continuously supervise the server units is eliminated. Where notification of a fault is not necessary, a notification cancellation request is transmitted to server unit for which the notification is unnecessary, whereupon the destination registration means cancels the registration of the registered manager unit according to the notification cancellation request from the manager unit.

Further, in this fault information notification system, although the fault information in the server unit is managed by sequence numbers, a sequence number indicating newest fault information is provided in the fault recording means so that the newest fault information can be easily obtained. By referring to sequence numbers indicating fault information, according to a fault history search request from the manager unit which does not include a sequence number, the newest fault information is responded thereto. By this means, the newest fault information can be easily obtained.

In this way, since it is unnecessary to continuously operate the manager unit to supervise the server units, calculator resources can be effectively used. Also, since the manager unit can obtain the necessary fault information at the necessary time, calculator resources can be effectively used. Further, with respect to a user-manager, the same fault history can be referred to from any arbitrary terminal on the network.

DETAILED DESCRIPTION OF THE INVENTION

Figure 1:
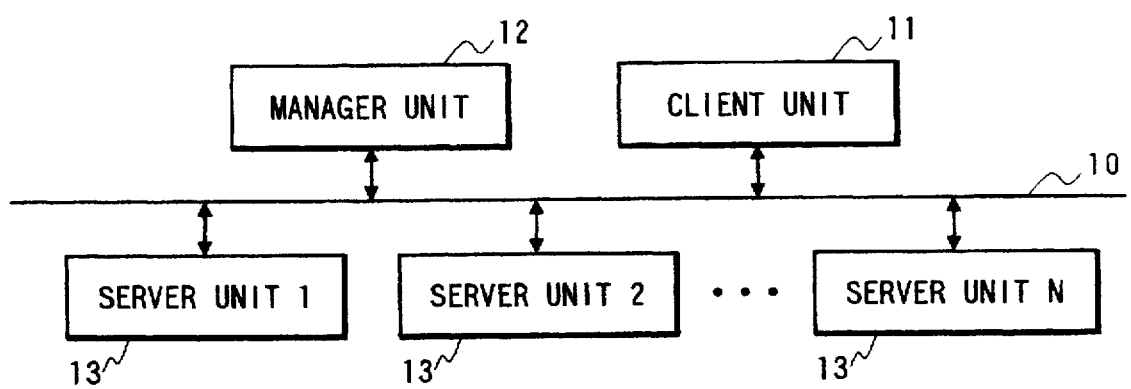
FIG. 1 is a diagram illustrating the system structure of the fault information notification system according to an embodiment of the present invention.
Figure 2:
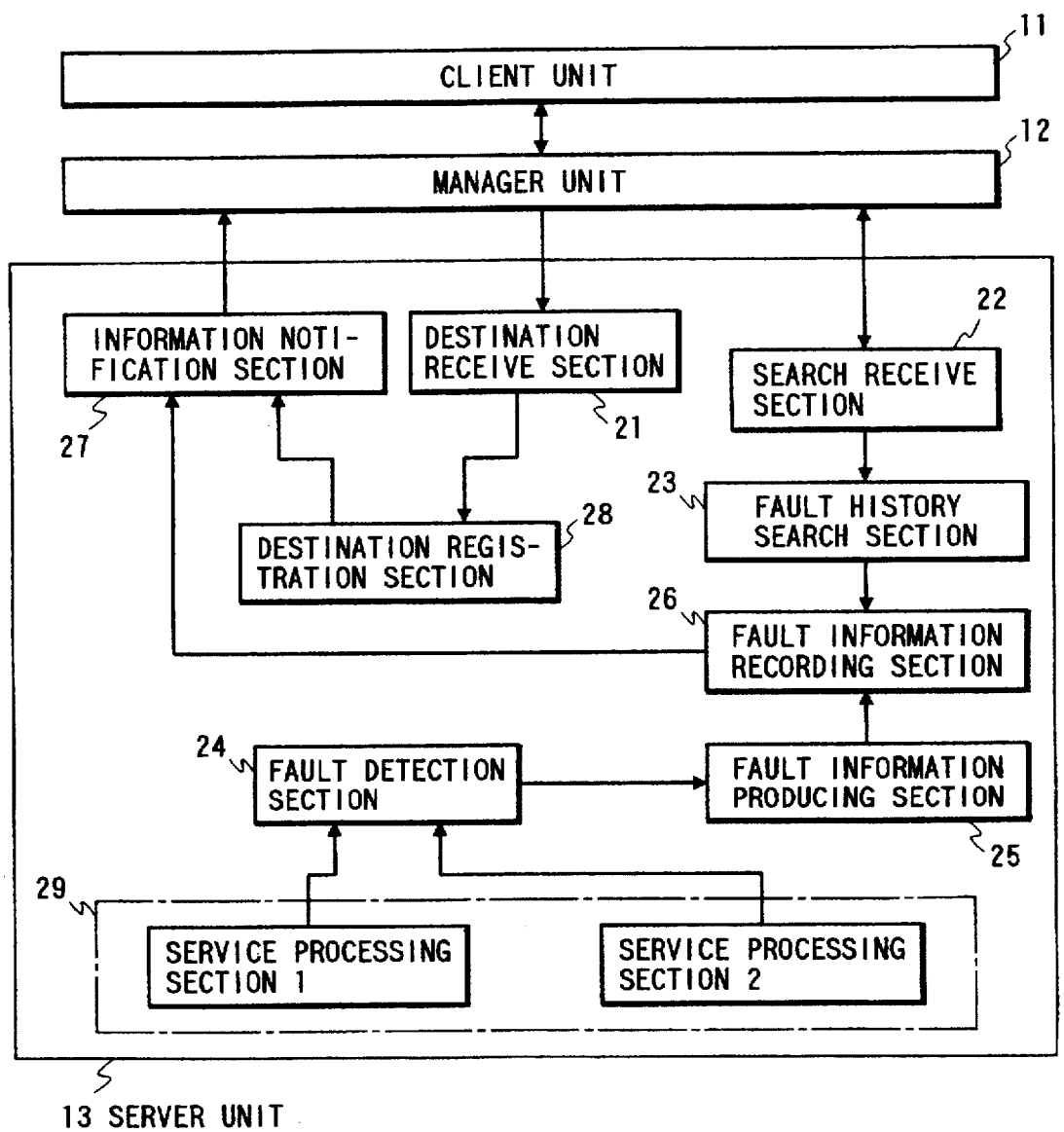
FIG. 2 is a block diagram showing the structures of main components of a server unit according the embodiment.

Herebelow, preferred embodiments of the present invention will be concretely described with reference to the drawings. FIG. 1 is a diagram illustrating the system structure of the fault information notification system according to the first embodiment of the present invention. In FIG. 1, 10 is a network communication path such as a LAN (Local Area Network) or the like, 11 is a client unit, 12 is a manager unit, and 13 is a server unit. The fault information notification system here is constructed in a network system in which a plurality of server units 13 and a manager unit 12 for managing the server units are connected to the network communication path 10. For this reason, in addition to a service processing section for normal service, various system components as illustrated in FIG. 2 are provided in the server unit 13. Faults detected by the various server units 13 on the system are reported to the manager unit 12 which manages the server units 13. In a state of normal system operation, the client unit 11 performs a processing request directly to the server units 13 according to a request for respective processing contents, and in the case of a processing request for the plurality of server units 13, performs the processing request via the manager unit 12.

FIG. 2 is a block diagram showing the structures of main components of a server unit according the present embodiment. Also, the block diagram shown in FIG. 2 shows processing blocks relating mainly to the structure of the server unit and at the same time is a diagram showing the flow of data.

In FIG. 2, 11 is a client unit, 12 is a manager unit, 13 is a server unit, 21 is an destination receiving section 21, 22 is a search receiving section 22, 23 is a fault history search section, 24 is a fault detection section, 25 is a fault information producing section, 26 is a fault information recording section, 27 is an information notification section, 28 is a destination registration section, and 29 is a service processing section.

The destination receiving section 21 of the server unit 13 receives a fault notification request from the manager unit 12 and additionally registers the destination for an destination registration request in an destination registration table of the destination registration section 28. Also, where an destination cancellation request is performed from the manager unit 12, the requested destination which is the relevant manager unit 12 is eliminated from the destination registration table of the destination registration section 28. The search receiving section 22 receives a fault history search request from the manager unit 12, passes this request to the fault history search section 23, awaits search execution, and returns the result of the search to the manager unit 12. In the fault history search section 23, as explained below, fault information in a log file of the fault information recording section 26 is read out based on a sequence number included in the fault history search request.

The service processing section 29 is a processing section for executing primary service processing provided by the server unit 13. The fault detection section 24 detects error information from each of the service processing sections 29 or other faults of the relevant server unit 13. The content of the fault detected here is passed to the fault information producing section 25. In the fault information producing section 25, fault information is produced according to the contents of the detected fault and this fault information is passed to the fault information recording section 26. In the fault information recording section 26, upon fault information being passed, the sequence number of the relevant fault information is determined, this is recorded in a sequence number column of the fault information, and the relevant fault information is recorded in a log file. Then the fault information is passed to the information notification section 27. In the information notification section 27, the passed fault information is reported to the manager unit 12 which is the destination recorded in the destination registration table of the destination registration section 28.

Requests such as fault history search requests or fault notification requests from the manager unit 12 are transmitted using a remote procedure call (hereafter abbreviated as RPC). The protocol type by which the manager unit 12 receives the fault information and the protocol address in which the manager unit 12 receives the fault notification are included in the argument of this RPC procedure. Accordingly, the manager unit 12, prior to performing a fault notification request, determines the protocol type to be used and the protocol address for receiving the fault notification. Then, the determined protocol type and protocol address are designated as an argument.

Figures 3, 4:
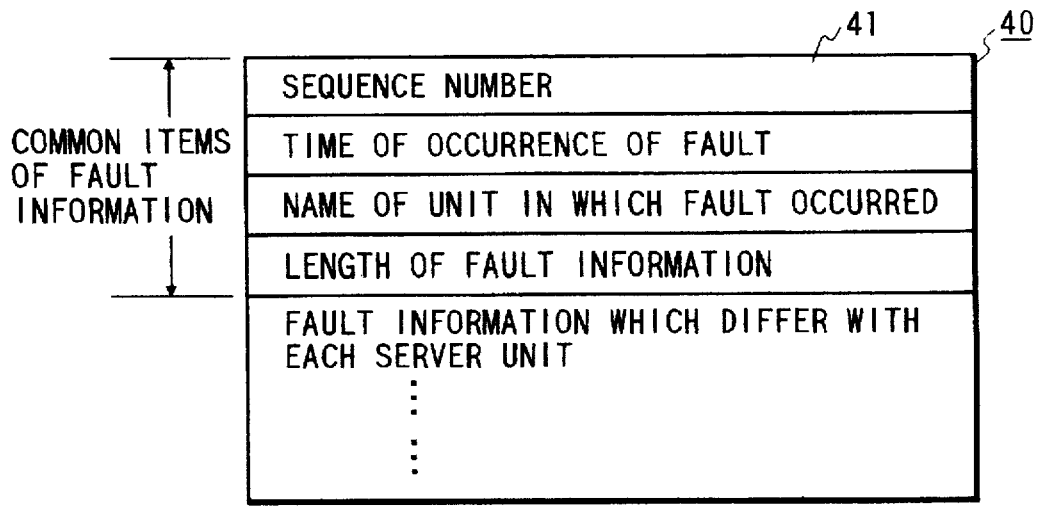
FIG. 3 is a diagram showing an example of an destination registration table of an destination registration section.
FIG. 4 is a diagram illustrating a data structure of fault information.

FIG. 3 is a diagram showing an example of a destination registration table of the destination registration section. As shown in FIG. 3, the destination registration table 30 is formed by a number field 31, a protocol field 32, a destination address field 33, a port field 34 and an in-use flag field 35, and where registering a manager unit which is one destination, the data of each field is registered as the data of that entry.

The value of a number which is the index is stored in the number field 31. When a notification request has been received, the value of this number is returned to the manager unit. When cancelling a notification request, the manager unit specifies this value as the index. The type of protocol reporting the fault information to the manager unit is specified in the protocol field 32. The network address of the host unit which the manager unit operates is set in the destination address field 33. A port number to be used for the manager unit to receive the fault notification is set in the port field 34 by a calculator specified by a connection address. Also, an in-use flag or not-in-use flag is set by the in-use flag field 35. Where the in-use flag is set, this indicates that the relevant entry is the current subject of notification, and where the not-in-use flag is set, this indicates that the relevant entry is not the current subject of notification.

Specifically, since the return value of the RPC is the index (value of the number field 31) of the manager unit registered as the destination, the manager unit 12 maintains this index. In the process of registration of the destination into the destination registration table 30, the entries of the destination registration table 30 are searched in order, the entry in which the in-use flag column reads "not-in-use" is found, and the protocol type and protocol address transmitted by the argument are respectively recorded in the protocol field 32 and the destination address field 33. Then the in-use flag is changed to "in-use". Where there are no empty entries in the destination registration table 30, the table is enlarged to provide a new entry and the new manager unit is entered in this added entry. Also, cancellation of the fault notification request (registration cancellation) from the manager unit 12 is similarly performed by RPC.

What the manager unit 12 specifies by the argument is a value of an index number of the destination registration table 30 returned as a return value when a fault notification request is performed by the RPC. The destination receiving section 21 in each server unit 13 performs by making the in-use flag of the entry of the index number specified by the argument "in-use" in the destination registration section 28.

Figure 5:
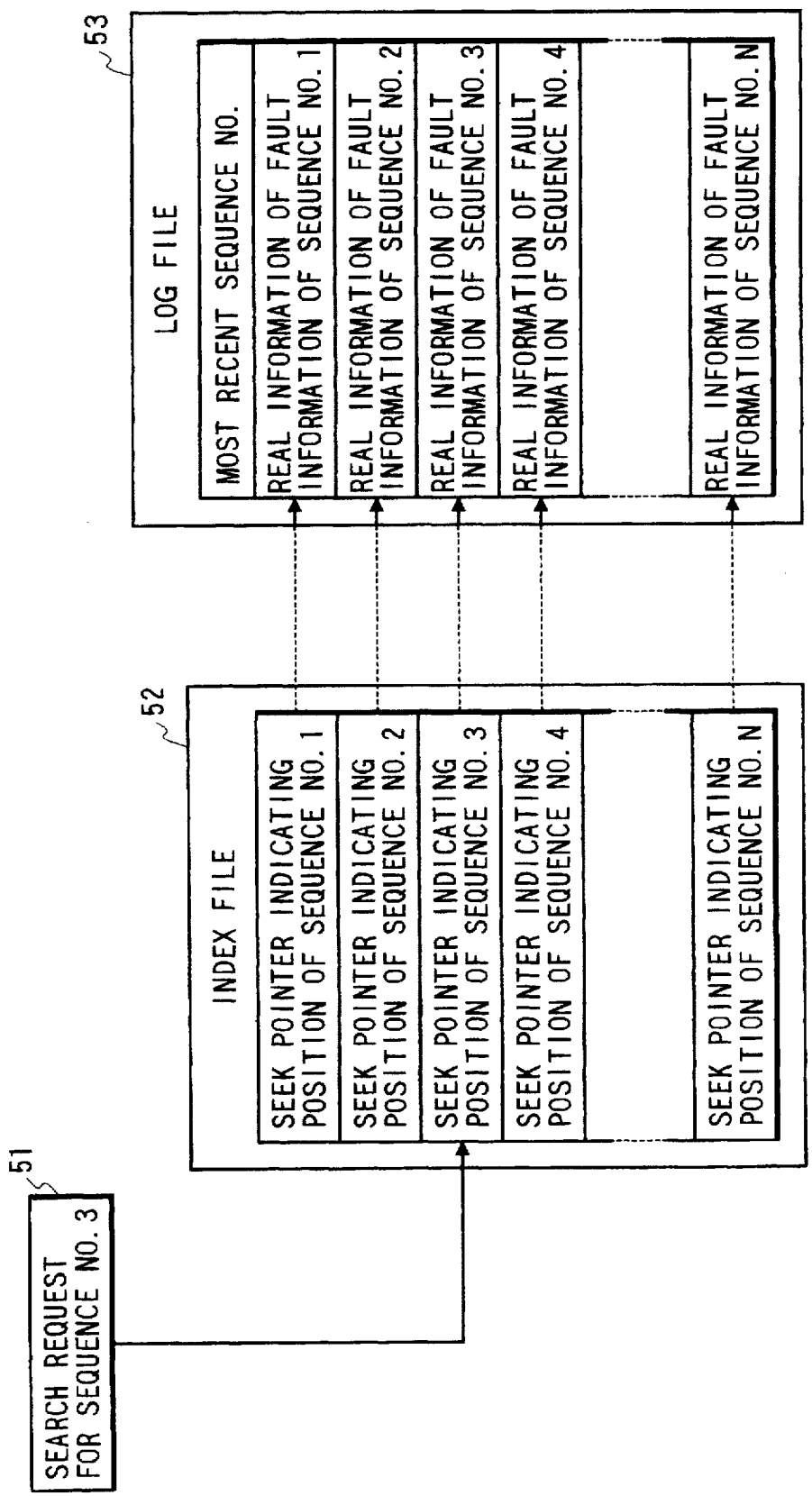
FIG. 5 is a diagram illustrating a log file structure recorded by the fault information.

FIG. 4 is a diagram illustrating the data structure of the fault information and FIG. 5 is a diagram illustrating a log file structure recorded by the fault information. As shown in FIG. 4, in addition to the contents of real information on the fault information, a sequence number 41 is added to the fault information 40 and it is recorded. The contents of the real information of the fault information comprises management information of the time of fault occurrence, the name of the unit in which the fault occurred, and the length of the fault information, and real information of fault information differing from server unit to server unit.

Also, the log file for recording and managing the fault information, as shown in FIG. 5, is formed of two files which are an index file 52 indicating a storage position of the fault information from the sequence number of a search request 51 which includes the sequence number and a log file 53 in which real information of the fault information is recorded as a history. Consequently, the log file access process of the fault information recording section 26 from the fault history search section 23 is accompanied by a conversion process from the sequence number of the fault information to position in which the log file is recorded.

Figure 10:
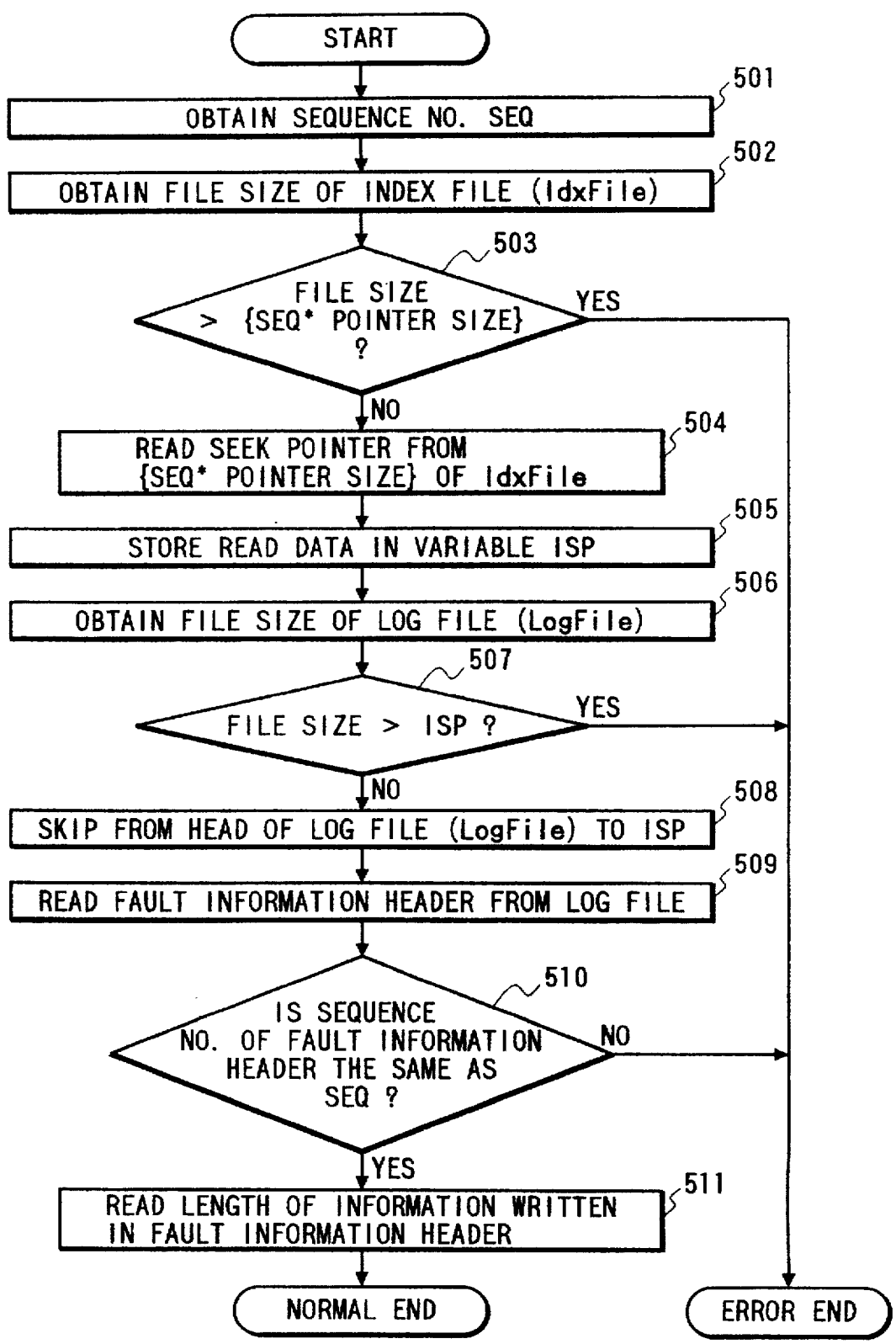
FIG. 10 is a flowchart showing the process flow of read order of a fault history.

Here the sequence numbers are numbers assigned as 0, 1, 2, ... in the order in which the fault information is generated. The position (seek pointer) in which the real contents of the main body of the fault information is recorded in the log file 53 as fault history is recorded in a position of "(sequence number )×(seek pointer size)" from the head of the index file 52. By this means, upon a sequence number being assigned by a search request, a seek pointer of the index file 52 is read from a position calculated by "(sequence number )×(seek pointer size)". This seek pointer indicates a position in which fault information corresponding to a seek pointer specified by the log file 53 is recorded. Thereby, it is possible to read out the fault information from the sequence number (FIG. 10).

The search receiving section 22 receives a search request from the manager unit 12 by RPC. The argument of this RPC is a sequence number and the return value is a fault history corresponding to the sequence number specified by the argument.

Note that, as described above, although a detected fault is processed as fault information in the server unit and passed to the fault information recording section 26 to be stored in a log file, in such a case the sequence number is set and recorded together with the fault information, and the relevant fault information is passed to the information notification section 27 together with the sequence number.

The information notification section 27, upon the fault information being passed, reports the fault information to the protocol address using the protocol of the protocol type recorded in an entry in which the in-use flag of the destination registration table 30 of the destination registration section 28 is "in-use". In the manager unit 12 the fault history can be read out using the sequence number of the received fault information. For example, if the manager unit 12 receives fault information of sequence number N, (N−m) is made the sequence number and by performing a specified search request, fault history information m items prior to the present can be referred to.

Note that when a notification request is received here, a filter processing may be performed so that the manager unit specifies the fault information which it wishes to inform to itself, and it receives only notification of the specified information. In this case, for example, a new field is added to the destination registration table 30, and the specified filter condition is records in that field. Further, the information notification section 27 judges whether a filter is set for the condition of the manager unit to which the fault information is to be notified, and restricts the notification.

Also, in the server unit 13, the manager unit can refer to fault history information from the newest entry without receiving a fault notification for each by the addition of an RPC which returns the value of the newest of the sequence numbers in the log file of the fault information. This is realized, as shown in FIG. 5, by using the newest information sequence number added to the log file.

Figure 6:
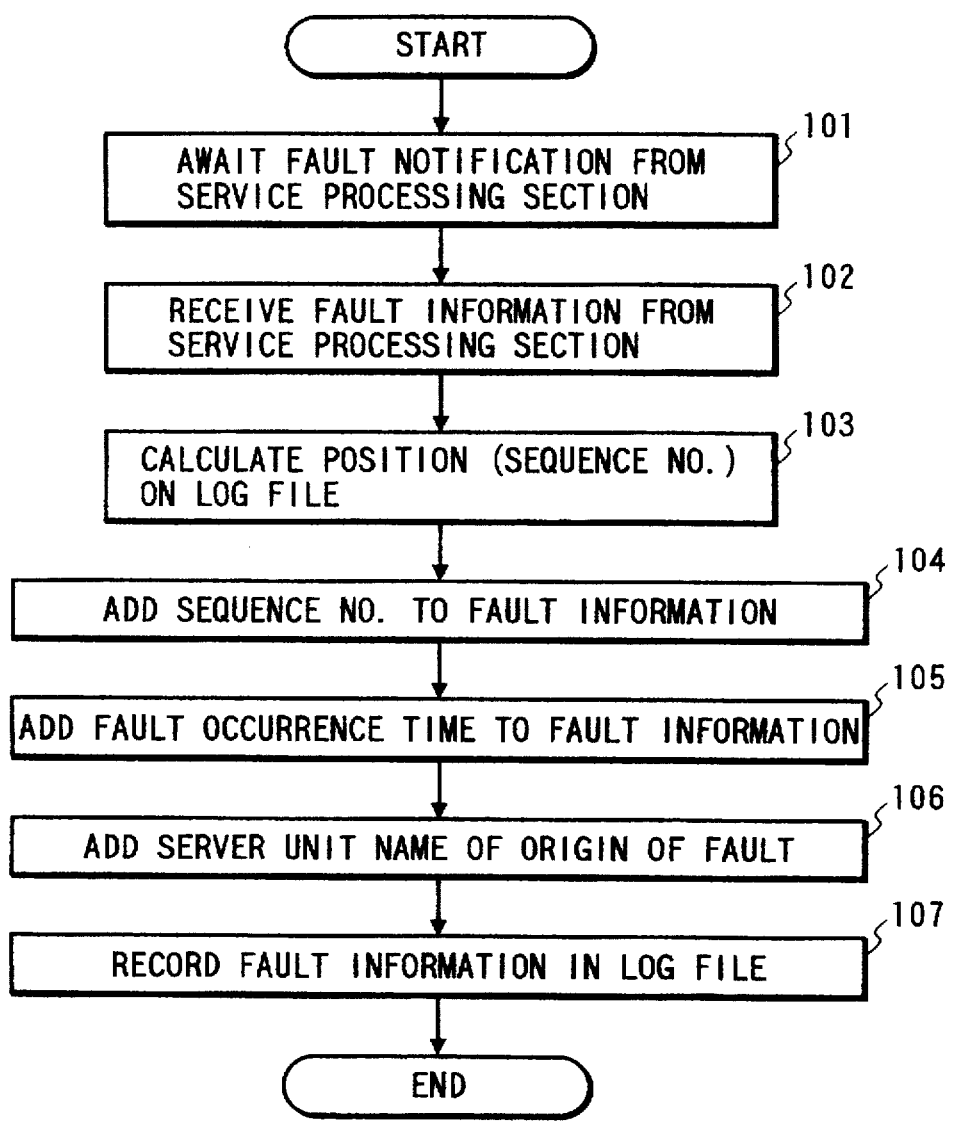
FIG. 6 is a flowchart for explaining the flow of fault detection and fault information recording processes in the server unit.
Figure 7:
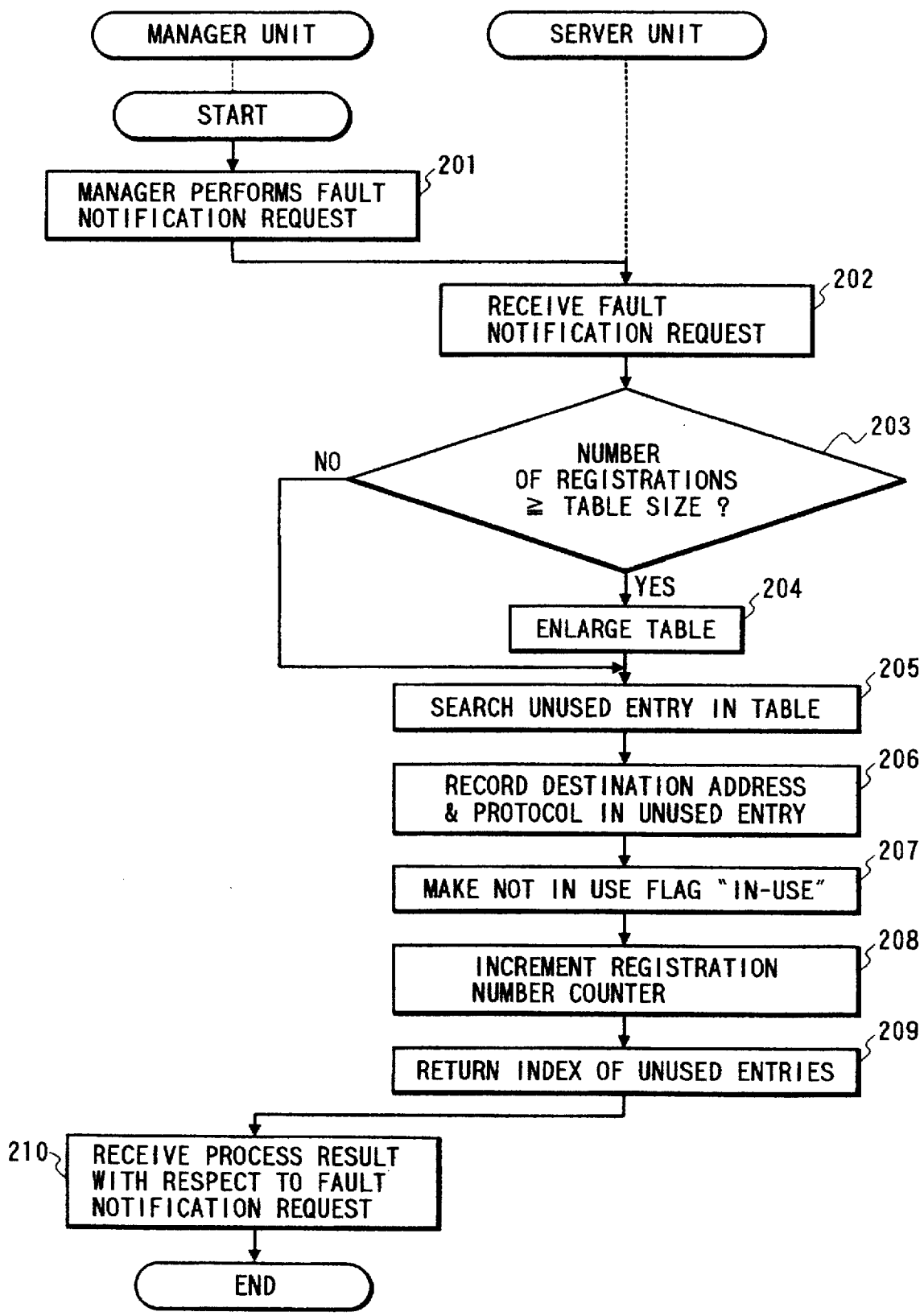
FIG. 7 is a flowchart for explaining the flow of a registration process of destination of fault notification.
Figure 8:
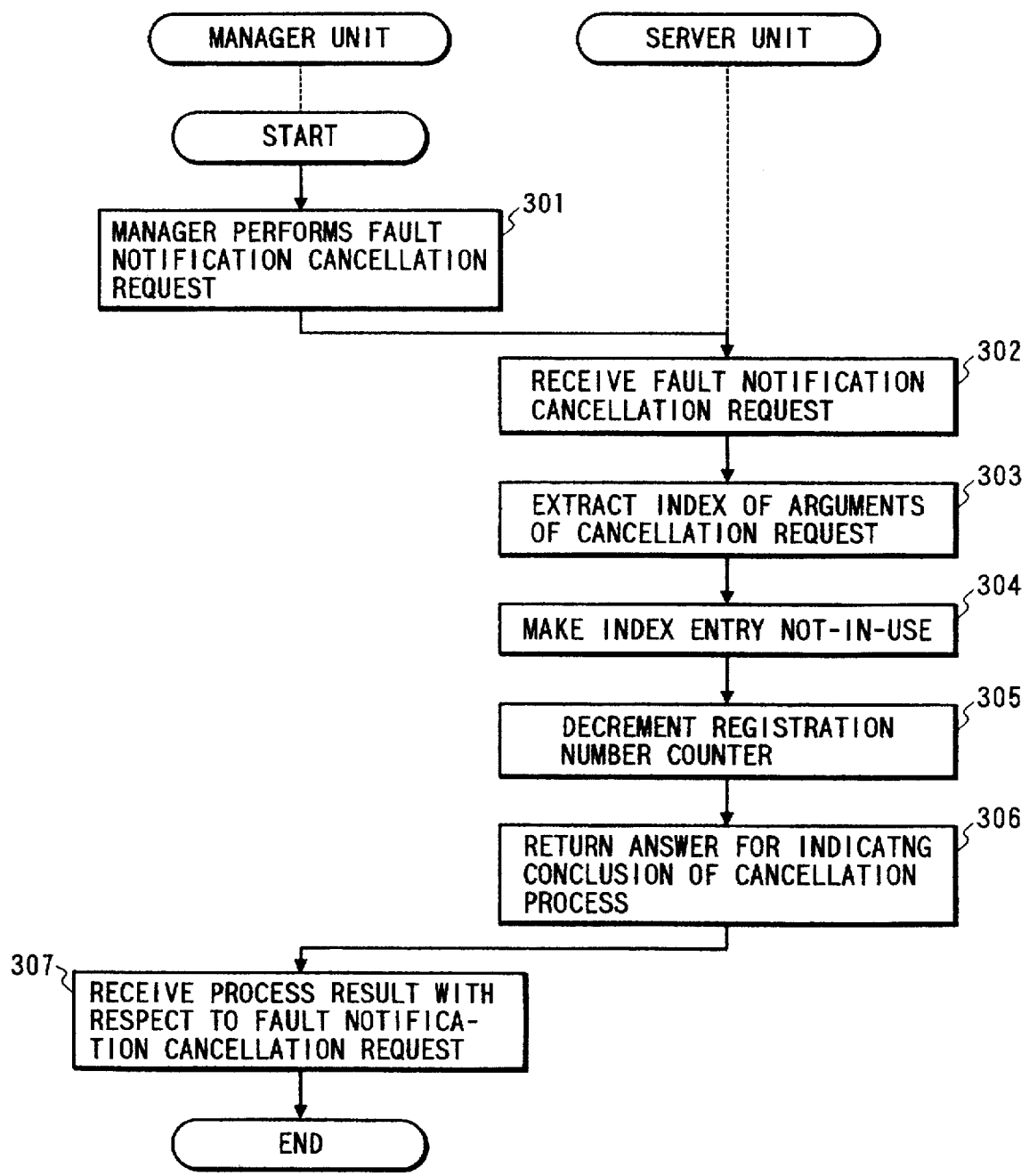
FIG. 8 is a flowchart for explaining the flow of a destination registration cancellation process.
Figure 9:
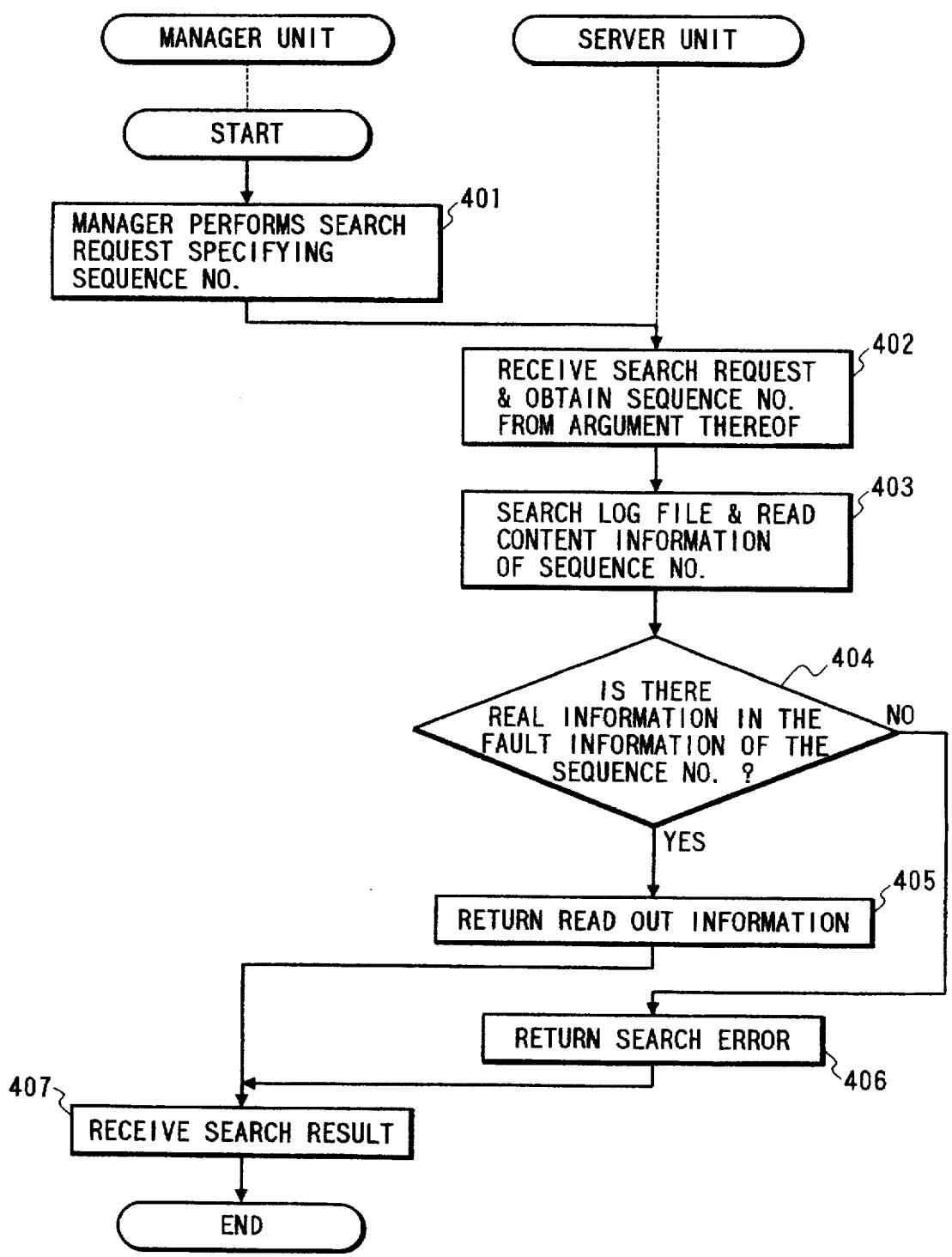
FIG. 9 is a flowchart for explaining the flow of a fault information search process.

Next, the characteristic processes in the fault information notification system of the present embodiment constructed as described above will be explained with reference to the flowcharts. FIG. 6 is a flowchart for explaining the flow of fault detection and fault information recording processes in the server unit and FIG. 7 is a flowchart for explaining the flow of a registration process of destination of fault notification. FIG. 8 is a flowchart for explaining the flow of a destination registration cancellation process. FIG. 9 is a flowchart for explaining the flow of a fault information search process and FIG. 10 is a flowchart showing the process flow of reading order of a fault history.

First, referring to FIG. 6, the flow of fault detection and fault information recording processes in the server unit will be explained. Fault detection is performed by the fault detection section 24. For this reason, the flow of control of the process starts from the process of the fault detection section 24. The fault detection section 24 awaits fault notification from a service processing section (step 101), and upon receiving the fault information from the service processing section (step 102), the flow of the control of the process shifts from the fault detection section 24 to the fault information producing section 25, and the position (sequence number) on the log file is calculated (step 103). Then, the sequence number is added to the fault information (step 104), the fault occurrence time is added to the fault information (step 105), and further, the server unit name which is the origin of the fault is added (step 106) and the fault information is recorded in the log file (step 107). By these means, the information is recorded in the fault information recording section 26.

Next, referring to FIG. 7, the flow of the registration process of destination of fault notification will be explained. This process is a process in which a server unit receives a fault notification request from a manager unit which is the origin of a registration request, and the relevant manager unit is registered in one entry of the destination registration table thereof as the destination. In the manager unit, the manager performs a fault notification request (step 201). In the server unit, the fault notification request is received (step 202). Then, the current number of registrations (contents of a registration number counter) and table size are checked (step 203) and where the table size is small, the table is enlarged (step 204).

Then, after confirming that an registrable entry exists, an unused entry in the table is searched (step 205), the manager unit which made the fault notification request is made the destination, and the destination address and protocol are recorded in the unused entry (step 206). Then, the not-in-use flag in the in-use flag field in made "in-use" (step 207). Next, the registration number counter is incremented (step 208), thereby returning the index (number value of the number field) of a required unused entry (step 209). In the manager unit, the processing result with respect to the fault notification request is received (step 210) and one continuous process is ended.

Next, referring to FIG. 8, the flow of a destination registration cancellation process will be explained. Also in this process, as in the registration process of destination of the fault notification of FIG. 7, the server unit receives a fault notification cancellation request from the manager unit which is the origin of a destination cancellation request, and eliminates the registration of the manager unit which is the destination already registered in an entry of the destination registration table. When the manager performs a fault notification cancellation request in the manager unit (step 301), this fault notification cancellation request is received in the server unit (step 302). Next, in the server unit, the index of the argument of the cancellation request is extracted (step 303) and the entry of the index is made unused. In other words, the in-use flag in the in-use flag field is made "not-in-use" (step 304).

Then, the registration number counter is decremented (step 305), and next an answer for indicating that the cancellation process has finished is returned (step 306). In the manager unit, the state of the process is confirmed by receiving a process result with respect to the fault notification cancellation request (step 307) and this continuous process is ended.

Next, the flow of the fault information search process will be explained. Referring to FIG. 9, also in a case where fault information is searched, the server unit receives a search request from the manager unit, searches a log file for fault information, and returns a search result to the manager unit. The search process starts by means of the search request including sequence number from the manager unit. That is, when the manager specifies a sequence number and performs a search request (step 401), the server unit receives the search request and obtains the sequence number from the argument thereof (step 402). Then, by means of the sequence number, the log file is searched and the contents information of the sequence number is read out (step 403). Next, it is judged whether the real information of the fault information of the relevant sequence number exists or not (step 404) and where the real information of the fault information exists, the information of the contents of the read-out real information is returned (step 405), while where the real information of the fault information does not exist, a search error is returned (step 406). In the manager unit, the returned search result is received (step 407) and here the fault information search process is ended.

In this type of fault information search process, a process of performing conversion from the sequence number of the fault information to the position in which the log file is recorded is performed. Next, referring to FIG. 10, a fault history read-out order process in which an access process is performed by means of the sequence number will be explained. Upon start of the process, first, in step 501, a sequence number SEQ is acquired. Next, in step 502, the file size of an index file (IdxFile) is obtained.

Next, in step 503, whether the file size is larger than (SEQ×seek pointer size) or not is judged. By checking this file size, registration in the index file of the seek pointer which indicates the location (address) of the real information corresponding to the sequence number of the read-out fault information, is checked. Upon confirmation of this, subsequently step 504 is proceeded to and the seek pointer corresponding to the relevant sequence number stored in the position (SEQ×seek pointer size) in the relevant index file is read out. Next, in step 505, the read-out data (pointer data) is stored in a variable ISP. Then, by Means of the data of this seek pointer, the real information of the fault information is read out from the log file.

For this reason, next, in step 506, the file size of the log file (LogFile) is obtained. Then, as in the previous process, in the next step 507, in order to check the file with respect to the contents of the seek pointer, it is judged whether the log file size is larger than the variable ISP (seek pointer contents). By means of the check of the file size, it is checked that the location (address) of the real information corresponding to the sequence number of the read-out fault information is in the relevant log file, and when this is confirmed, next the process proceeds to step 508 and skip is performed from the head of the relevant log file to the position of the seek pointer of the variable ISP, while in the next step 509, a fault information header is read out from the log file.

Then, in step 510, whether the sequence number of the fault information header is equal to the sequence number of the variable SEQ or not is judged, and where equal, step 511 is proceeded to and the length of the fault information written in the fault information header is further read. Thereby, the real information of the fault information is read out from the log file.

As explained above, according to the fault information notification system of the present invention, since there is no need to continuously operate the manager unit to supervise the server unit, the calculator resources of the hardware apparatuses of the network system can be effectively used. Also, since the manager unit can obtain the necessary fault information at the necessary time, similarly, there is no necessity to continuously maintain fault information with respect to the plurality of server units, calculator resources can be effectively used. Further, with respect to the user-manager, the same fault history can be referred to from an arbitrary terminal (client unit) on the network via the manager unit.

What is claimed is:

1. A fault information notification system, comprising:
   a network communication path;
   a plurality of server units connected to said network communication path;
   a manager unit connected to said network communication path and managing said server units, faults detected by said server units being notified to said manager;
   wherein each of said server units comprises:
   fault information producing means for producing fault information for various faults detected by said server unit to which a sequence number is assigned;
   fault recording means for recording the produced fault information in an extractable data structure; and
   fault history search means for searching corresponding fault history information from said fault recording means in response to a fault history search request including said sequence number from said manager unit.

2. The fault information notification system according to claim 1, wherein
   said fault history search request includes a plurality of sequence numbers, and
   said fault history search means searches a plurality of fault history information corresponding to said fault history search request.

3. The fault information notification system according to claim 1, wherein
   said fault recording means includes a sequence number indicating latest fault information, and
   the latest fault information is notified when said fault history search request from said manager unit does not include said sequence number.

4. A fault information notification system comprising:
   a network communication path;
   a plurality of server units connected to said network communication path;
   a manager unit connected to said network communication path and managing said server units, faults detected by said server units being notified to said manager;
   wherein each of said server units comprises;
   fault information producing means for producing fault information for various faults detected by said server unit to which a sequence number is assigned;
   fault recording means for recording the produced fault information in an extractable data structure;
   fault history search means for searching corresponding fault history information from said fault recording means in response to a fault history search request including said sequence number from said, manager unit;
   destination registration means for registering said manager unit as a destination of fault notification according to a fault notification request from said manager unit; and
   notification means for, in response to production of fault information by said fault information producing means, notifying said manger unit which has been registered in said destination registration means of the produced fault information to which the sequence number has been assigned.

5. The fault information notification system according to claim 4, wherein said destination registration means deletes registration of said registered manager unit according to a notification cancellation request from said manager unit.

6. A fault information notification method for notifying a manager unit of faults detected by a server unit on a network system in which a plurality of server units and the manager unit which manages the server units are connected in a network, wherein each server unit executes the steps of:
   producing fault information for various faults detected by said server unit to which a sequence number is assigned;
   recording the produced fault information in an extractable data structure; and
   searching corresponding fault history information from said recorded information in response to a fault history search request including said sequence number from said manager.

7. A computer program product executable with a computer for fault information notification, said computer program product controlling the computer to execute the steps of:
   producing fault information for various faults detected by said computer to which a sequence number is assigned;
   recording the produced fault information in an extractable data structure; and
   searching corresponding fault history information from said recorded information in response to a fault history search request including said sequence number from a management computer for managing said computer.

* * * * *

UNITED STATES PATENT AND TRADEMARK OFFICE
CERTIFICATE OF CORRECTION

PATENT NO. : 5,708,775
DATED : January 13, 1998
INVENTOR(S) : Jun NAKAMURA

It is certified that error appears in the above-identified patent and that said Letters Patent is hereby corrected as shown below:

Claim 4, column 10, line 19, after "said" (second occurence), delete ",".

Signed and Sealed this

Twenty-first Day of July, 1998

BRUCE LEHMAN

Attest:

Attesting Officer

Commissioner of Patents and Trademarks